United States Patent [19]

Cramer

[11] Patent Number: 4,838,031

[45] Date of Patent: Jun. 13, 1989

[54] INTERNALLY COOLED COMBUSTION CHAMBER LINER

[75] Inventor: Paul S. Cramer, Naugatuck, Conn.

[73] Assignee: Avco Corporation, Providence, R.I.

[21] Appl. No.: 82,861

[22] Filed: Aug. 6, 1987

[51] Int. Cl.[4] .................... F02C 3/00

[52] U.S. Cl. .................... 60/753; 60/39.091; 60/760

[58] Field of Search .............. 60/753, 752, 760, 39.32, 60/39.091; 416/241 B; 428/608

[56] References Cited

U.S. PATENT DOCUMENTS

| | | | |
|---|---|---|---|
| 2,548,945 | 4/1951 | Lubbock . | |
| 3,886,735 | 6/1975 | Irwin | 60/39.65 |
| 3,918,255 | 11/1975 | Holden | 60/39.65 |
| 4,004,056 | 1/1977 | Carroll | 428/138 |
| 4,064,300 | 12/1977 | Bhanger | 428/120 |
| 4,071,194 | 1/1978 | Eckert et al. | 239/127.3 |
| 4,269,032 | 5/1981 | Meginnis et al. | 60/754 |
| 4,273,824 | 6/1981 | McComas et al. | 416/241 B |
| 4,302,940 | 12/1981 | Meginnis et al. | 60/754 |
| 4,312,186 | 1/1982 | Reider | 60/754 |
| 4,312,599 | 1/9182 | Darolia | 416/241 B |
| 4,315,406 | 2/1982 | Bhanger et al. | 60/754 |
| 4,338,380 | 7/1982 | Erickson et al. | 416/241 B |
| 4,629,397 | 12/1986 | Schweitzer | 416/241 B |
| 4,720,244 | 1/1988 | Kluppel et al. | 416/241 B |

*Primary Examiner*—Louis J. Casaregola
*Assistant Examiner*—Timothy S. Thorpe
*Attorney, Agent, or Firm*—Perman & Green

[57] ABSTRACT

A combustion chamber liner having a layer of refractory material, a layer of metallic material, means to adaptably fix the layer of refractory material to the layer of metallic material and a means for internally cooling the liner. The means to adaptably fix the layer of refractory material to the layer of metallic material allows both layers to expand and contract separately without risk of damaging the liner because of different thermal expansion rates. The means for internally cooling the liner allows the liner to operate at higher temperatures and increases the useful life of the liner.

11 Claims, 3 Drawing Sheets

INTERNALLY COOLED COMBUSTION CHAMBER LINER

BACKGROUND OF THE INVENTION

1. Field of the Invention

This invention relates to combustion chamber liners for use in apparatus such as a gas turbine engine, and more particularly, to a combustion chamber liner having an internally cooled labyrinth assembly.

2. Description of the Prior Art

A cross-reference is made to U.S. patent application Ser. No. 07/082,808 filed on Aug. 6, 1987 now allowed, assigned to the same assignee as herein and entitled "Combustion Chamber Liner Having Failure Activated Cooling and Detection System" by the same applicant as herein.

Combustion apparatus or combustors are used in various applications to produce heat or burn a fuel in a controlled environment. One particular use of combustors has been in the area of gas turbine engines. As employed in a gas turbine engine, a combustor ordinarily includes an exterior housing and an interior combustion chamber. Fuel is burned in the interior of the combustion chamber producing a hot gas usually at an intensely high temperature such as 3,000° F. or even higher. To prevent this intense heat from damaging the combustor before it exits to a turbine, a heat shield or combustion chamber liner is provided in the interior of the combustion chamber. This combustion chamber liner thus prevents the intense combustion heat from damaging the combustor or surrounding engine.

In the past, various types of combustion chamber liners have been suggested and used. In addition, a variety of different methods have been suggested how to cool these liners so as to withstand greater combustion heat or prolong the useable life expectancy of the liner. U.S. Pat. No. 2,548,485 by Lubbock and U.S. Pat. No. 3,918,255 by Holden disclose various types of combustion chamber liners. Other U.S. Patent Nos. that describe cooling of combustion chamber liners include U.S. Pat. No. 4,004,056 by Carroll, U.S. Pat. No. 4,269,032 by Meginnis et al, U.S. Pat. No. 4,302,940 by Meginnis, and U.S. Pat. No. 4,315,406 by Bhanger et al. U.S. Pat. No. 4,064,300 by Bhanger has also described a two sheet laminate being connected by heat conductive portions with a cooling fluid passing between the two sheets.

Also in the past, combustion chamber liners were made of special metal alloys. These metal alloys were manufactured to withstand the intense heat in the combustor and allow for a controlled heat transfer so as not to damage or endanger the surrounding engine. However, the cost of these types of metal alloys was unreasonably high and thus lead to the use of a metal and ceramic combination of materials for liners. The use of a metal and ceramic combination liner greatly reduced manufacturing cost of liners in addition to providing a more efficient heat shield.

A problem arises in using presently available combustion chamber liners that have a combination ceramic and metallic material in that ceramic material is normally brittle whereas metallic material is normally ductile, as a result, thermal gradients or differing thermal expansions between the ceramic and metallic material from the intense heat of the combustion chamber results in a substantial likelihood of a crack or break in the ceramic material. This crack or break in the ceramic material is generally known as a failure and allows heat to escape the combustion chamber resulting in further damage to the combustion chamber liner, the combustor and possibly the entire engine.

A further problem arises in using presently available combustion chamber liners having metallic and ceramic layers in that there are no means available to supply sufficient coolant to provide a directed internal cooling of the liner to prevent a failure from occurring.

A further problem arises in that ceramic and metallic combination combustion chamber liners do not have a suitable means to compensate for the inherently different heat expansion properties of the materials in addition to providing a means for cooling the interior of a combustion chamber liner.

SUMMARY OF THE INVENTION

The foregoing problems are overcome and other advantages are provided by a combustion chamber liner having a combined internally cooled labyrinth assembly and means to adaptably fix at least two layers of the liner together to compensate for differing thermal rates of expansion in these layers.

In accordance with one embodiment of the invention, the liner is manufactured in the form of a panel and has four layers; a first layer of refractory material, a second layer of structurally adaptable porous material, a third layer of heat transfer members and coolant paths and a fourth layer of metallic material. The fourth layer is intended to be mounted to the interior of the combustion chamber wall and has an appropriate mounting means thereon. The fourth layer also has passageways for the passage of coolant into the interior portions of the liner.

The third layer, in this embodiment, is adjacent the fourth layer and communicates with the coolant passageways of the fourth layer. In this embodiment the third layer comprises heat transfer posts that extend from the fourth layer with open areas between the posts for coolant to pass through. The posts are selectively positioned on the fourth layer in such a manner as to present an intricate structure or maze for the coolant to pass. The coolant is allowed to exit the liner at selected edges of the liner panel.

The second layer is mounted to the heat transfer posts of the third layer and is made of entangled metallic filaments similar to steel wool. The entangled filaments or matting has the first layer mounted or formed thereon and allows for irregular or separate movements between the first layer and the third and fourth layers due to different thermal expansion rates. The second layer also is capable of allowing coolant flow therethrough via voids among the entangled filaments. The coolant flow in the second layer allows for heat transfer to the coolant from the second layer and the internal side of the first layer.

The first layer is generally a refractory material such as ceramic which is resistant to heat and hard to melt. The refractory material of the first layer forms the layer adjacent the combustion zone of the combustion chamber and thereby protects the liner, combustor and apparatus the combustor is used in.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
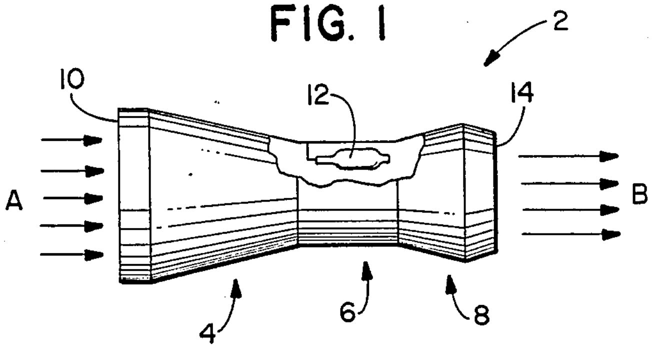
FIG. 1 is a diagrammatic view of a gas turbine engine having a combustor incorporating features of the present invention.

Referring to FIG. 1, a gas turbine engine 2 is shown. The gas turbine engine of FIG. 1 is merely shown as a representational apparatus in which a combustor is employed. It should be understood that the combustion chamber liner of the present invention is intended for use in all combustion apparatus having combustion chamber liners and is not intended to be limited to use in gas turbine engines.

The engine 2 in FIG. 1 generally has three main sections; an air compressor section 4, a combustion section 6 and a driving turbine section 8. The air compressor section 4 takes in air at the inlet 10 as shown by flow arrows A and compresses the air for introduction into the combustion section 6. The combustion section 6 has several combustors or combustion apparatus 12. Air is directed into these combustors 12 with fuel also being introduced and mixed with the air to provide an appropriate mixture for efficient combustion. Spent fuel, the heat product from combustion and additional cooling air are then forced into the driving turbine section 8 and exit at the exhaust portion 14 of the engine 2 as shown by flow arrows B.

Figure 2:
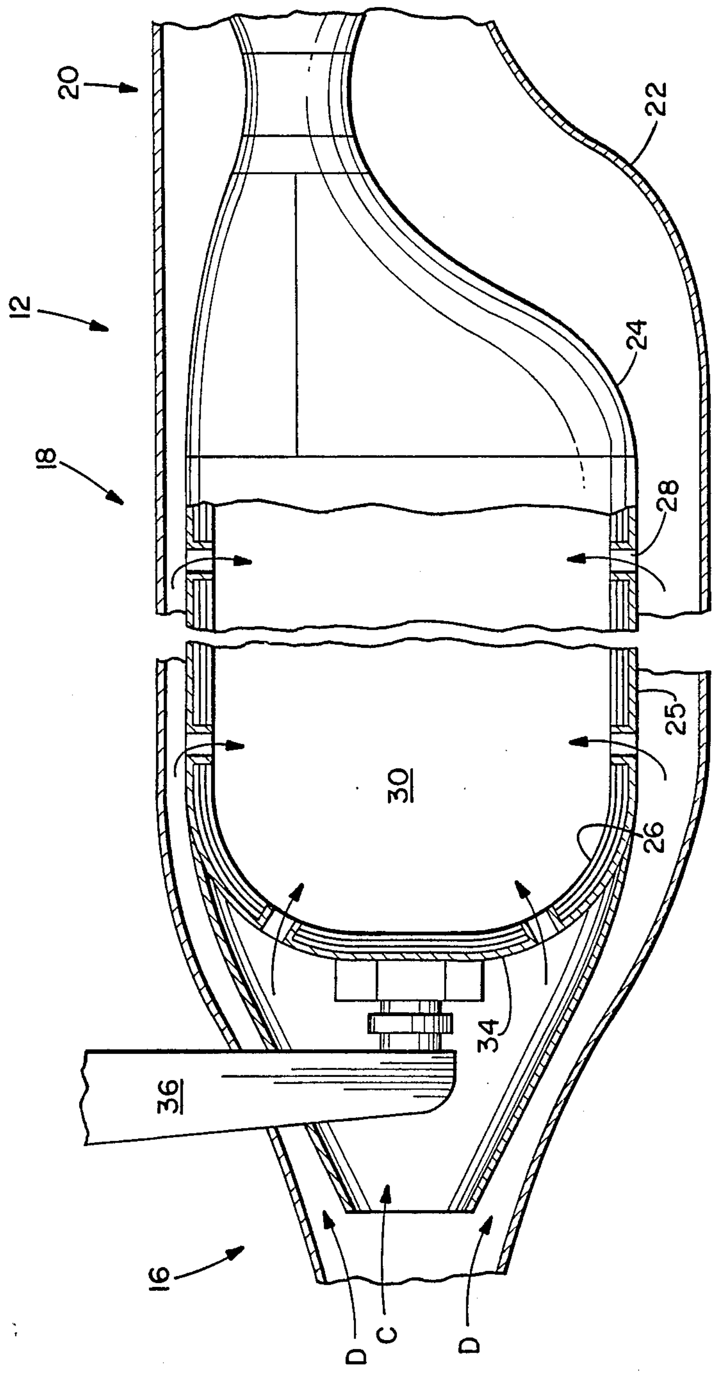
FIG. 2 is an enlarged cross-sectional view of the combustor of FIG. 1.

Referring now to FIG. 2, a more detailed description of one of the combustors 12 of FIG. 1 will be given. FIG. 2 shows an enlarged sectional view of a combustor 12 from FIG. 1. The combustor 12 is generally described as having three main sections; an air and fuel entrance section 16, a combustion chamber section 18 and an exhaust section 20. A housing 22 is generally provided for the entire combustor 12 and is ordinarily made of a metal or a metal alloy.

The combustion chamber section 18 is generally circular in cross-section with a combustion chamber 24 mounted within the housing 22. The combustion chamber 24 comprises a chamber wall 25 and a combustion chamber liner 26 forming a combustion zone 30. The chamber wall 25 is ordinarily made of a metal or a metal alloy and provides a structure for the combustion chamber liner 26 to be mounted upon. The chamber wall 25 also has two types of channels for coolant flow such as air. The first type of channels is cooling and mixing channels or ports 28 which communicate through the chamber wall 25 from the exterior of the combustion chamber 24 and through the liner 26 into the interior of the chamber and the combustion zone 30. These cooling and mixing ports 28 allow air to enter the combustion chamber 24 into the combustion zone 30 for mixing with fuel for efficient combustion. The entering air also provides cooling of the exterior portion of the liner 26 adjacent the combustion zone 30. The second type of channels, liner cooling channels 32 (see FIG. 4), is generally smaller than the cooling and mixing ports 28. They are located throughout the chamber wall 25 where the liner 26 is mounted. These liner cooling channels 32 ordinarily have a specified size, shape and relation to one another and communicate from the exterior of the combustion chamber 24 to a mounting side of the liner 26. The liner cooling channels 32 provide a path for air to flow to the interior of the liner 26.

The air and fuel entrance section 16 of the combustor 12 communicates with the air compressor section 4 of the engine 2 and a fuel supply means (not shown). Compressed air is directed into the entrance section 16 and is generally separated into two paths. The first path of air, shown by flow arrow C, is directed towards a head 34 of the combustion chamber for cooling the chamber 24 and also for mixing with the fuel in the combustion zone 30. The second path, shown by flow arrows D, is directed around the outside of the combustion chamber 24 between the chamber 24 and the housing 22. This second path also provides cooling to the exterior of the chamber 24 in addition to supplying air for the cooling and mixing ports 28 and the liner cooling channels 32. A fuel conduit and dispensing nozzle 36 is connected to the chamber head 34 and provides fuel to the combustion chamber 24 and combustion zone 30 from the fuel supply means (not shown).

The exhaust section 20 of the combustor 12 communicates from the combustion chamber section 12 t the drive turbine section 8 of the engine 2. The exhaust section 20 performs as a type of funnel to direct the air, heat and spent fuel into the drive turbine section 8 to drive a turbine (not shown) and thereafter exits the engine in an impulse thrust.

Figure 3:
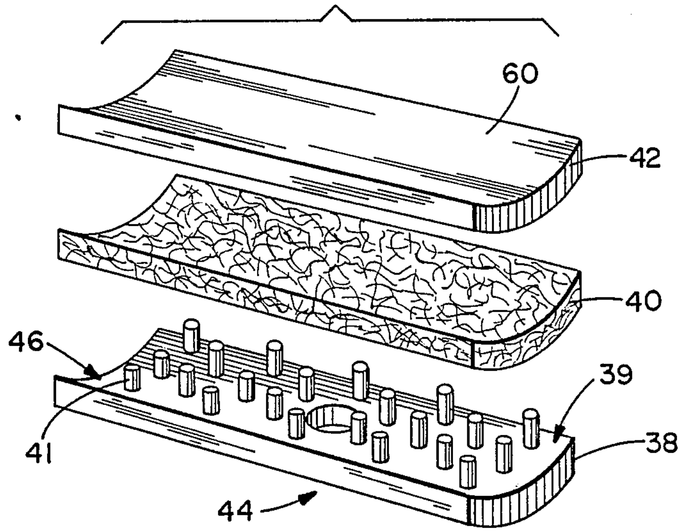
FIG. 3 is an exploded perspective view of a liner panel incorporating features of the present invention.
Figure 4:
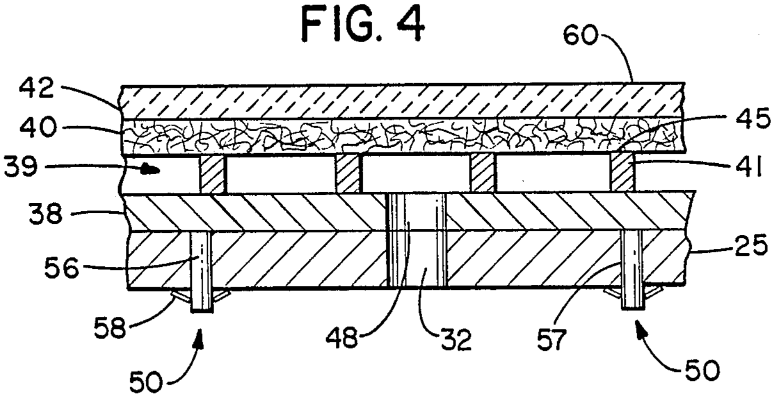
FIG. 4 is an enlarged partial cross-sectional side view of the liner assembly in FIG. 3 mounted to a combustion chamber wall.

Referring now to FIGS. 3 and 4, one embodiment of a combustion chamber liner incorporating features of the invention will be described. FIG. 3 shows an exploded perspective view of a liner 26 manufactured as a panel and intended to be used with other liner panels to line a combustion chamber. Although the following description relates to a liner panel that is attached to the chamber wall 25, the invention is also intended to include a unitary liner placed in or fabricated on the chamber wall 25 or any other type of liner assembly. The liner 26 generally comprises four layers; a first refractory or ceramic type layer 42, a second layer 40 of porous material such as a steel wool type entangled metallic filament, a third labryinth or maze type heat transfer layer and a fourth metallic layer 38. The four layers are manufactured into a single liner 26 or in this embodiment a liner panel.

In the embodiment shown in FIG. 3, the liner panel 26 is substantially rectangular with a slight curve. The curved shape is generally provided to allow the liner 26 to be cooperatingly mounted on the circular cross-sectional shape of the chamber wall 25. In addition, although the liner panel 26 is substantially rectangular in this embodiment, any type of suitable shape can be used so long as the panel can matingly cooperate with adjoining panels.

The fourth layer 38 is generally made of a metal or metal alloy material. The fourth layer 38 has two opposing sides; a first or bottom side 44 and a second or top side 46. The first side 44 is for mounting the liner 26 adjacent the interior portion of the chamber wall 25. Mounting means 50 are located on the first side 44 to fix the liner 26 to the wall 25. In the embodiment shown, the mounting means 50 is a post 56 and fastenclip 58 type of fastener. However, any suitable type of mounting means can be used such as rivets, welding, bolts, etc. The posts 56, as shown in FIG. 4, extend through appropriate holes 57 in the chamber wall 25 and thereafter have the clips 58 attached thereon. The clips 58 are generally large enough to prevent the posts 56 from being withdrawn from the hole 57 in the chamber wall 25 and thus retainingly fix the liner 26 to the wall 25.

Coolant channels or passageways 48 pass through the fourth layer 38 from the first side 44 to the second side 46. In the embodiment of FIG. 3 the panel 26 only has a single passage 48. The passageways 48, similar to the liner cooling channels 32 in the chamber wall 25, also have a specified size, shape and relation to one another and can generally be aligned with the liner cooling channels 32 of the chamber wall 25 when the liner is mounted. When the passageways 48 are aligned with the liner cooling channels 32, cooling fluid can access the interior of the liner 26 by passage through the liner cooling channels 32 and passageways 48 into the second and third layers 40 and 39 of the liner 26 throughout the entire panel.

The third layer 39 is located adjacent the top side 46 of the fourth layer 38 (as viewed in FIG. 3) and is generally described as an internal heat exchange layer. In the embodiment shown in FIGS. 3 and 4, the third layer 39 comprises multiple heat exchange members or posts 41. The posts 41 are generally made of a material such as metal which can quickly transfer heat and are mounted to the top side 46 of the fourth layer. The heat exchange members or posts 41 are arranged in a labyrinth or maze type order. The remainder of the third layer 39, in this embodiment, is a series of open coolant flow paths. The flow paths, which can generally be described as tortuous, are defined by the labyrinth structure and the location of the heat exchange members 41. Although the heat exchange members 41 have been described as posts, it is apparent that alternate embodiments would include other forms of heat exchange members such as fins and grooves in or on the fourth layer 38. Further, the third layer 39 need not be mounted to the fourth layer 38, but may in fact be incorporated, at least partially, into the fourth layer 38 such as by grooves.

The second layer 40, in FIGS. 3 and 4, is located above the third layer 39. In this embodiment, the second layer 40 is brazen onto the top portions 45 of the heat exchange members 41. However, any suitable means could be used to bond or fix the second layer 40 to the third layer 39. The second layer 40 has generally been described as a porous type of material which is structurally adaptable such as a steel wool type of material. The material of the second layer 40 in this embodiment is generally made of a metallic material in the form of fibers or filaments that are entangled to form a mat, pad or cushion type layer. However, any type of suitable material could be used as the material for the second layer that could withstand the heat in the liner and act as an adjustable structural nexis between the first layer 42 and the remaining portions of the liner. In a preferred embodiment, the second layer 40 is made of a material known commercially as BRUNSBOND, a trademark of Brunswick Technetics of Deland, Fla.

To better understand the description of the second layer 40, some of the properties that the second layer should possess will be described. One functional property the second layer should possess is the ability to transport coolant to areas adjacent the first layer 42. This function is generally accomplished by the entangled filamentary or fibrous nature of the second layer 40 having voids the filaments in the material. Coolant can pass to the first layer 42 through the available voids in the material. In a preferred embodiment, the material of the second layer 40 allows the coolant to be located throughout the second layer 40 and substantially across the adjacent side of the first layer 42.

The material in the second layer 40 can also be fabricated in various and varying densities, in that the amount and size of the voids in the material can be preselected. By selecting a specified density, the rate of flow of a cooling fluid can, at least partially, be controlled. For example, a second layer material with a high density, having a relatively small number and size of voids, would present a difficult or restricted path for the flow of coolant and may in fact present a virtual barrier to the flow of the coolant through various preselected portions of the liner 26. On the other hand, a second layer material with a low density, having a relatively large number and size of voids, would present a relatively easy path for the coolant to flow and thereby allow a higher rate of flow through the second layer.

A second functional characteristic of the filamentary material in the second layer 40 is a structural integrity sufficient to retain the first layer 42 in the liner configuration. Although the second layer 40 need not be the sole means of retaining the assembly of the four layers 38, 39, 40 and 42 together, it may at least be capable of partially performing this assembly retaining task.

A third type of functional characteristic of the filamentary material in the second layer 40 is a structural adaptability or nexis to allow for different or varying thermal expansions between the first layer 42 and the third layer 39 or fourth layer 38. As described above, the fourth layer 38 and third layer 39 are generally made of a metallic material and the first layer is generally a ceramic type of material. These two types of materials, metallic and ceramic, ordinarily have different and unequal thermal expansion coefficients or rates. In addition, metallic material is normally ductile, whereas ceramic material is normally brittle. As a result of the different properties of these materials and the high intensity of heat generated in the combustion chamber, the second layer 40 of filamentary material acts as an adaptable or adjustable structural nexis between the first layer 42 and the remaining portions of the liner as the layers expand and contract because of the heat. The second layer 40 thus allows the first layer 42 and the remaining portions of the liner to expand and contract independently of each other with a substantial reduction in the risk that the brittle material of the first layer 42 might crack of break due to the unequal thermal expansion rates.

The first layer 42 is the inner most layer of the liner 26 and is intended to line or abut the combustion zone 30. Because of the intense heat generated in the combustion zone 30 the first layer must possess excellent thermal properties such as possessed by a ceramic material. In a preferred embodiment, a ceramic material, such as metal oxide, is used as the refractory material for the first layer 42. The first layer 42 is generally bonded or applied to the second layer 40 by means such as plasma spraying; however, any suitable bonding or application means could be used to form, bond or attach the first layer 42.

In addition to excellent thermal properties, the first layer 42 should also be impervious to seal a top side 60 of the liner 26. Thus any cooling fluid that enters the second layer 40 from the exterior of the chamber wall 25 is ordinarily not allowed to exit the liner 26 through the first layer 42. In a preferred embodiment, the edges of the liner panel 26 are not sealed in any manner. Thus, coolant entering into the interior of the liner 26 is allowed to exit the liner through the panel edges in the second and third layers 40 and 39, respectively. In other embodiments the four edges of the liner panels 26 may be selectively sealed or not sealed to allow only one, two or three edges from which the coolant could exit the liner. In yet another embodiment, the edges of the second or third layers 40 and 39 could alternatively be sealed or not sealed separate and independent from each other. In yet another alternate embodiment, the edges of the liner 26 are completely sealed thus establishing only one area in which cooling fluid could enter and exit the liner under normal operating conditions; the passageways 48 in the fourth layer 38.

Obviously, any suitable means could be used for sealing the edges of the liner panels 26. In one embodiment, the perimeter of the filamentary material of the second layer 40 can be slightly smaller about its edges than the third layer 39. The ceramic material of the first layer 42 can then be plasma sprayed onto the second layer 40 and also extended around the edges of the second layer 40. The ceramic material can stop at the bottom of the second layer 40 or in the alternative, extend down to the fourth layer 38 thereby sealing the edges of both the second and third layers 40 and 39, respectively.

It is also important to note the relative thickness of each layer in the liner as given by a preferred embodiment shown in FIG. 4. The first layer 42 has a range of thickness from about 0.060 inch to about 0.020 inch with a preferred thickness of about 0.030 inch. The second layer 40 has a range of thickness of about 0.040 to about 0.020 inch with a preferred thickness of about 0.030 inch. The third layer 39 has a thickness of about 0.010 inch to about 0.040 inch with a preferred thickness of about 0.025 inch. Finally, the fourth layer 38 has a range of thickness of about 0.015 inch to about 0.030 inch with a preferred thickness of about 0.020 inch.

In an alternate embodiment for sealing the edges of the liner 26, the second layer 40 can have various densities in specific portions of the layer 40. A highly dense portion of the second layer 40 can be formed about the edges thereby forming a barrier to the flow of coolant out of the second layer edges.

However, the interior of the second layer 40 can have a low density portion whereby coolant can flow with relative ease within the interior of the second layer 40. In this embodiment, the first layer 42 need only be applied to the top of the second layer 40 because the second layer edges are sealed by the dense perimeter of the second layer and need not be sealed by the ceramic material of the first layer 42. The perimeter of high density filamentary material in the second layer 40 can also be extended down to the fourth layer 38 and thereby seal the edges of both the second and third layers 40 and 39, respectively.

Referring now to FIGS. 4 through 8, various embodiments of the internally cooled matrix combustion liner will be described. The embodiments shown are presented to merely illustrate the various features of the invention through diversified embodiments and are not intended to restrict the use of these features from other forms of embodiments.

FIG. 4 shows a cross-sectional view of one embodiment of a liner 26 mounted on the chamber wall 25. Mounting means 50 has posts 56 and fastenclips 58 extending from the liner 26. The posts 56 extends through a mounting holes 57 in the chamber wall 25 and the fastenclips 58 are attached to the posts 56 to prevent the posts 56 from being withdrawn from the mounting holes 57. The air channel 48 of the fourth layer 38 is aligned with the liner cooling channel 32 in the chamber wall 25 to allow coolant to access the interior the liner. The third layer 39, in this embodiment, is composed of heat transfer posts 41. However, any suitable size, shape, or structure of heat exchange members could be used such as fins or grooves in or on the fourth layer 38. The posts 41 in this embodiment are separated from one another with an empty area therebetween for coolant to flow through. Mounted on top of the heat transfer members or posts 41 is the second layer 40 of filamentary steel wool type material. The second layer 40, in this embodiment, is brazed onto the top portions 45 of the posts 41. In this embodiment, the second layer 40 is generally maintained separate and apart from the open areas separating the posts 41. Thus, coolant entering the third layer 39 can travel through the third layer 39 without interference from the material in the second layer 40. The first layer 42 is plasma sprayed onto the second layer 40 and thus forms the unitary liner panel 26.

Figure 5:
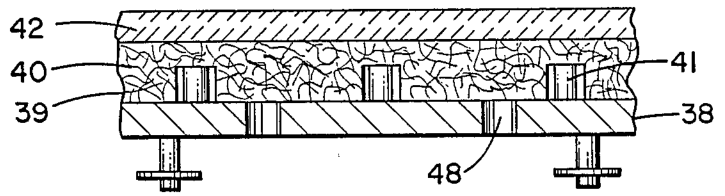
FIG. 5 is a partial cross-section side view of an alternate embodiment of the invention where the entangled filaments of the second layer extend into the open areas of the third layer.

Referring now to FIG. 5, an alternate embodiment of the invention is shown. In this embodiment, the heat transfer members 41 are heat exchange fins or fin groups. The fins 41 are mounted to the fourth layer 38. The material of the second layer 40, in addition to being located above the fins 41, also extends down into the areas between the fins 41 in the third layer 39. In the embodiment shown, the material of the second layer 40 is mounted to the fourth layer 38 by means such as vacuum brazing. In this embodiment, the coolant entering through the passageways 38 into the interior of the liner 26 has a flow resistance in the interior of the liner. The amount of flow resistance can be fixed by the degree of density of the filamentary material of the second layer 40. The ceramic material of the first layer 42 is once again bonded or attached to the second layer 40.

Figure 6:
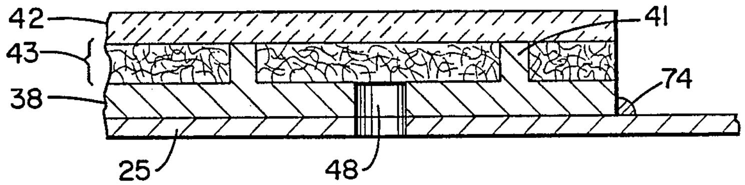
FIG. 6 is a partial cross-sectional side view of an alternate embodiment of the invention where the entangled filaments of the second layer are located predominately in the open areas of the third layer.

Referring now to FIG. 6, an alternate embodiment of the invention is shown. In this embodiment, the liner 26 is intended to be welded to the chamber wall 25 as evidenced by the weld bead 74 on the fourth layer 38 and chamber wall 25. The panel liner 26 also only has one passageway 48 contained in the fourth layer 38. In this embodiment, the passageway 48 is centrally located. However, the single passageway embodiment may have the passageway located anywhere throughout the fourth layer to allow for efficient cooling. Extending from the fourth layer 38 are the heat transfer members 41 of the third layer 39. In this embodiment, the heat transfer members 41 are integrally formed with the fourth layer 38 and therefore, no bonding or joining is needed between the heat transfer members and the fourth layer 38. The second layer 40 in the embodiment of FIG. 6, is formed coplaner with the third layer 39 in that the material of the second layer is predominantly located in the open areas between the heat transfer members 41 and thereby forms a hybrid or combination second/third layer 43. The filamentary material in this embodiment, is bonded or attached to both the heat transfer members 41 and the fourth layer 38 by means such as brazing. The heat transfer members 41, in this embodiment, extend to the top of the filamentary material. The first layer 42 is then bonded, sprayed or attached to both the filamentary material and the tops of the heat transfer members 41. In an alternate embodiment, a suitable protective layer may be provided at the top of the heat transfer members 41 to prevent the material of the first layer 42 from bonding to the tops of the heat transfer members 41, but at the same time allowing attachment of the refractory material to the filamentary material of the second layer 40.

Figure 7:
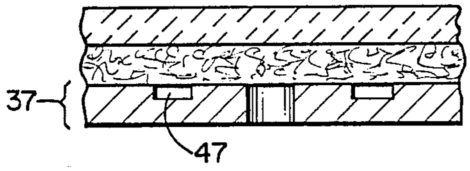
FIG. 7 is a partial cross-sectional side view of an alternate embodiment of the invention where the labyrinth cooling configuration if formed by etched grooves in the interior side of the fourth layer.

In FIG. 7, the heat transfer members of the third layer 39 have been removed and replaced by an alternative heat transfer means comprising grooves located throughout the top or second side 46 of the fourth layer 38. Thus, the fourth layer 38 has become a combination third/fourth layer 37 providing the functions of both the third and fourth layers. The grooves 47 in the third/fourth 37 layer may be made by any suitable means such as etching. The grooves 47 may also be in communication with the passageway 48. In this embodiment, the grooves are open in that no filamentary material of the second layer is located in the grooves 47 and therefore there is a free flow path for coolant to flow in the grooves. The second layer 40 is attached to the top or second side 46 of the third/fourth layer 37 and the first layer 42 is bonded to the top of the second layer 40.

Figure 8:
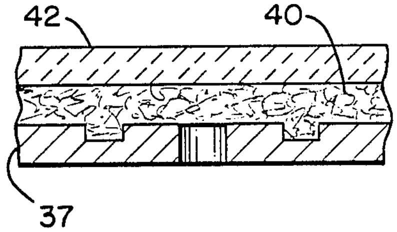
FIG. 8 is a partial cross-sectional side view of an alternate embodiment of the invention similar to FIG. 7 wherein the entangled filaments of the second layer extend into the grooves of the fourth layer.

FIG. 8, shows an embodiment similar to that of FIG. 7. However, in this embodiment, the filamentary material of the second layer 40 extends into the grooves 47 of the third/fourth layer 37. This type of embodiment allows for an increased amount of surface area on the top side 46 of the third/fourth layer 37. In addition, this type of embodiment also allows for a decrease in the height of the liner.

Figure 9:
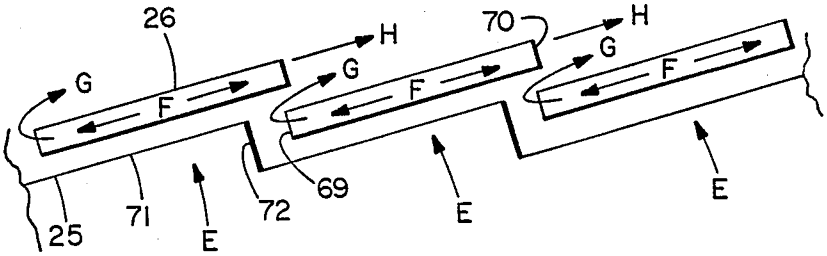
FIG. 9 shows a schematic view of a combustion chamber wall and liner assembly.

FIG. 9 shows a schematic view of a partial cross-section of one embodiment of a chamber wall 25 having liner panels 26. In this embodiment, each liner panel 26 has two open edges, a first open edge 69 and a second open edge 70. The chamber wall 25 is configured to form a repeating slope 71 and ledge 72 configuration. The liner panels 26 are mounted wit their first open edges 69 located near the ledge portions 72 of the chamber wall 25. The panel liners 26 extend up the slope portions 71 of the chamber wall 25 and past the next ledge 72 overlapping the first open edge 69 of the next panel liner 26.

In the configuration shown, coolant enters into the liner panels 26 through the liner cooling channels 32 as shown by flow arrows E. Once the coolant enters the interior of the liner panels 26 it is forced towards the first and second open edges 69 and 70 as shown by flow arrows F. As the coolant exits the first open edge 69 it reverses direction and travels along the exterior surface of the liner towards the exhaust section 20 of the combustor as shown by flow arrows G. As the coolant exits the second open edge 70 it continues along its direction cooling the exterior surface of the next adjacent liner as shown by flow arrows H.

It should be understood that the foregoing description is only illustrative of the invention. Various alternatives and modifications can be devised by those skilled in the art without departing from the scope of the invention. Accordingly, the present invention is intended to embrace a 11 such alternatives, modifications and variances which fall within the scope of the appended claims.

What is claimed is:

1. A combustion chamber liner having an internal cooling layered assembly comprising:

first layer means of refractory material, said first layer being substantially impervious and having a first thermal expansion rate;

second layer means of porous material, said second layer being structurally adaptable;

third layer means of heat transfer members, said third layer also having paths for coolant to flow through; and fourth layer means of metallic material having a second thermal expansion rate and coolant passage means passing through said fourth layer means from a first side to an opposite second side proximate said third layer means whereby coolant can enter the liner through said coolant passage means into said third layer means to internally cool the liner so as to withstand high temperature and said second layer means allows said first and fourth layer means to expand at different thermal expansion rates with substantially no risk of damage to the liner from said different expansion rates.

2. A liner as in claim 1 wherein said refractory material is ceramic.

3. A liner as in claim 1 wherein said second layer means is an entangled fibrous metallic material having a changeable form.

4. A liner as in claim 1 wherein said second layer means is substantially coplanar with said third layer means.

5. A liner as in claim 1 wherein said heat transfer members comprises grooves in said fourth layer means.

6. A liner as in claim 1 further comprising means for mounting the liner in a combustion chamber.

7. A liner as in claim 1 wherein the liner is in the form of a panel having panel edges.

8. A liner as in claim 7 wherein at least one of said panel edges is at least partially sealed.

9. A liner as in claim 1 wherein said third layer means comprises a cooling labyrinth for transferring heat to a coolant.

10. A liner as in claim 7 wherein at least a portion of said second and third layer means are intermixed.

11. A liner as in claim 8 wherein at least one of said panel edges is at least partially open.

* * * * *